May 9, 1967 G. DE COYE DE CASTELET 3,318,168
TRANSMISSION MECHANISMS FOR VEHICLES HAVING A POWER
UNIT WITH BUILT-IN TRANSMISSION AND FINAL DRIVE
Filed Sept. 17, 1964 4 Sheets-Sheet 1
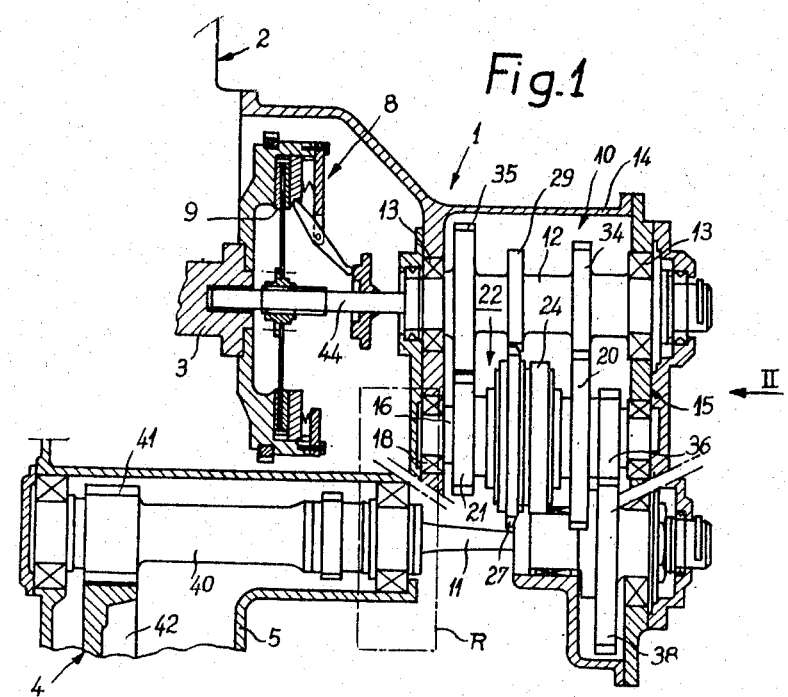
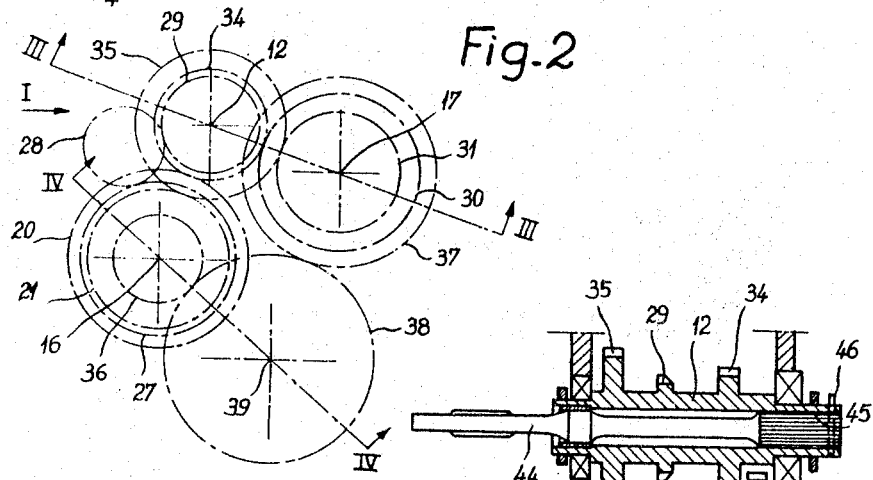
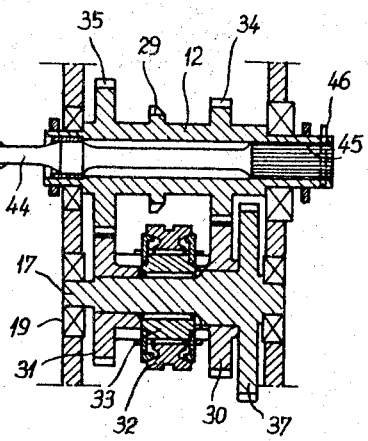
Inventor
Gaëtan DE COYE DE CASTELET
By Stevens Davis Miller & Mosher
Attorneys Inventor
Gaëtan De Coye De Castelet
By Stevens, Davis, Miller & Mosher
Attorneys

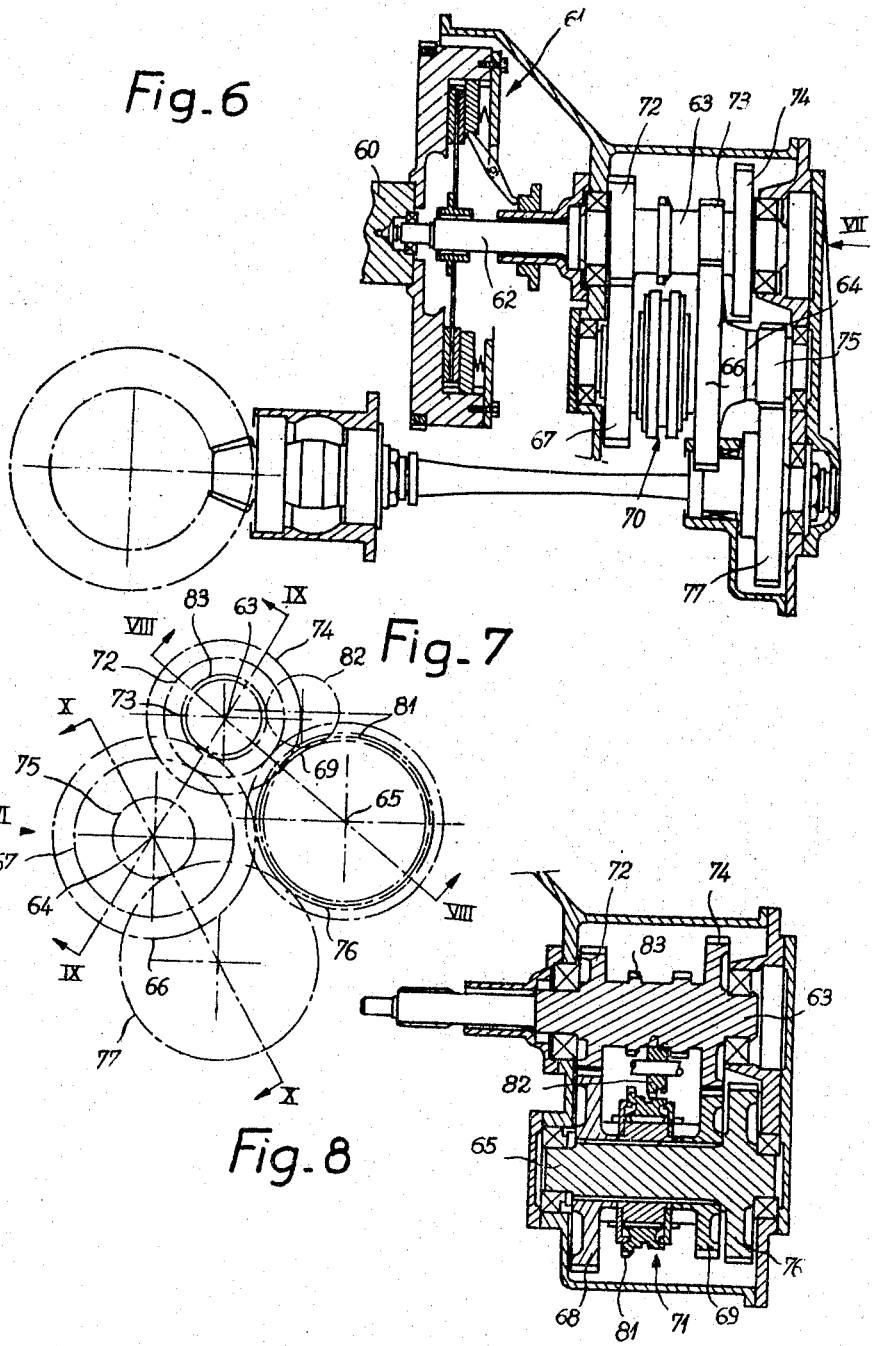

United States Patent Office 3,318,168
Patented May 9, 1967

3,318,168
TRANSMISSION MECHANISMS FOR VEHICLES HAVING A POWER UNIT WITH BUILT-IN TRANSMISSION AND FINAL DRIVE
Gaëtan de Coye de Castelet, Billancourt, France, assignor to Regie Nationale des Usines Renault, Billancourt, France
Filed Sept. 17, 1964, Ser. No. 397,104
Claims priority, application France, Sept. 25, 1963, 948,633, Patent 1,378,948
5 Claims. (Cl. 74—359)

This invention relates in general to transmission mechanisms and has specific reference to a transmission mechanism for vehicles having a power unit with built-in transmission and final drive, that is, an assembly comprising a clutch-and-gearbox mechanism coupled directly to the output end of the crankshaft and a differential underlying the engine and connected by a transmission shaft to said mechanism.

This known general disposal is advantageous notably in that, in the case of a power unit and transmission assembly designed for longitudinal mounting with respect to the vehicle, whether at the front or at the rear, the positional centering as well as the proper distribution of the engine weight to the corresponding driving axle are greatly facilitated. This disposal is also particularly advantageous in the case of a vehicle having a transverse-mounted power unit and transmission assembly.

The present invention is concerned primarily with a transmission mechanism for an assembly of the type set forth hereinabove, wherein more particularly the gearbox or change-speed transmission mechanism is designed with a view to permit, with respect to conventional arrangements providing four forward speeds, on the one hand a substantial reduction in the longitudinal dimension of the power unit and transmission assembly, as measured in the axial direction of the crankshaft, and on the other hand the use of a direct counter-shaft from its output positioned on the same side as its input, said counter-shaft lying outside the clutch space.

This invention is characterized primarily in that the change-speed mechanism comprises in addition to its primary shaft two lay shafts carrying each a pair of loosely rotating pinions constantly meshing with two companion pinions rotatably solid with the primary shaft, and between said loose pinions a sliding or striker ring adapted selectively to cause one or the other of said loosely rotating pinions to become rotatably solid with the lay shaft carrying same, each lay shaft further comprising a third pinion revolving bodily therewith and in constant meshing engagement with a reversing gear common to both last-named pinions and rigid with an output shaft in axial alignment with said transmission shaft.

Other advantageous features of this invention will appear as the following description proceeds with reference to the accompanying drawings illustrating diagrammatically by way of example typical forms of an embodiment of the invention. In the drawings:

FIGURE 1 is a side elevational and part-sectional view showing the essential part of a transmission mechanism according to this invention, with the casing sectioned or suppressed to show more clearly the component elements of the mechanism, this view being taken in the direction of the arrow I of FIGURE 2;

FIGURE 2 is a diagrammatic end view of the transmission mechanism as seen in the direction of the arrow II of FIGURE 1 in order clearly to show the different shaft axes and their relative positions, as well as the meshing engagement occurring between the various transmission members shown in FIGURES 1, 3 and 4;

FIGURE 3 is a fragmentary sectional view taken upon the line III—III of FIGURE 2;

FIGURE 6 is a view similar to FIGURE 1 but showing on a smaller scale an alternate form of embodiment of the transmission mechanism of this invention in the case of a commercial vehicle equipped with a power unit and transmission assembly to be mounted longitudinally on the vehicle, the view being taken in the direction of the arrow VI of FIGURE 7;

FIGURE 7 is a diagrammatic end view similar to FIGURE 2 of the arrangement illustrated in FIGURE 6, the view being taken in the direction of the arrow VII of this figure and showing together the various axial positions of the shafts as well as the relative meshing engagements between transmission members showing in FIGURES 6, 8, 9 and 10;

FIGURE 8 is a section taken upon the line VIII—VIII of FIGURE 7;

Figure 4:
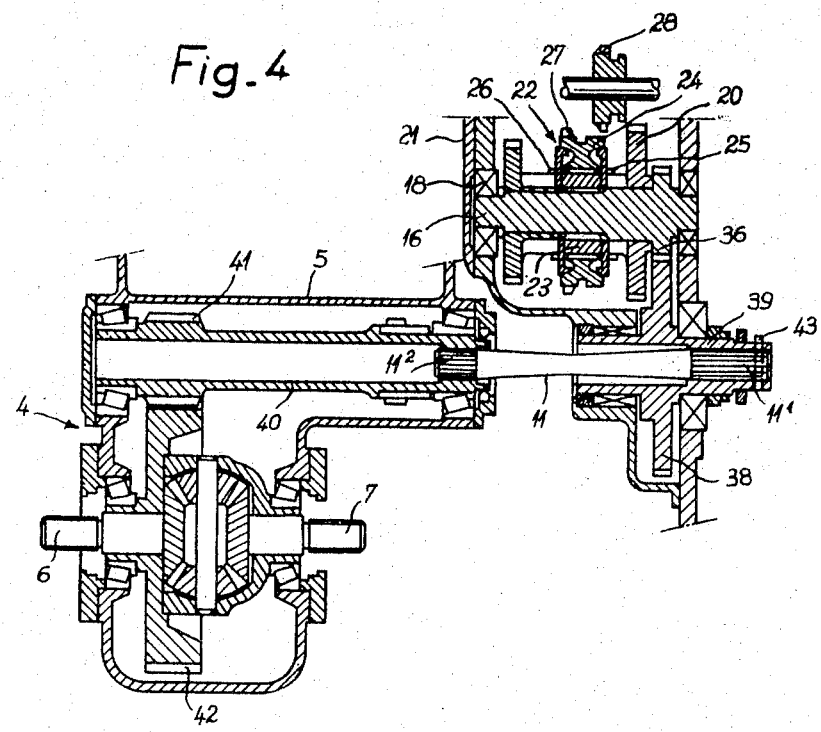
FIGURE 4 is another fragmentary sectional view taken upon the line IV—IV of FIGURE 2.

The transmission mechanism for a power unit and transmission assembly shown in FIGURES 1 to 5 inclusive comprises, as clearly shown notably in FIGURE 1, a clutch and gearbox assembly enclosed in a casing 1 mounted at the output end of the engine cylinder-block shown diagrammatically at 2, this mechanism being in axial alignment with the crankshaft 3 and comprising furthermore a differential 4 having its casing 5 mounted beneath the engine crankcase or sump. Both casings 1 and 5 may be constructed either as a unitary structure or as shown in this example to constitute two separate units with a view to facilitate not only the casting operations but also the proper alignment of the shafts. In this respect it may be reminded that the construction illustrated by way of example is intended to be transverse-mounted on the vehicle therefore, the output shafts 6, 7 of the differential are parallel to the crankshaft 3 (see FIGURES 1 and 4).

In this example the clutch 8 is a conventional single-disc friction clutch 9 but this design is not compulsory, the gearbox proper 10 and the differential 4 being operatively connected on the other hand through a transmission shaft 11 extending parallel to the engine crankshaft and outside the diametral dimensions of the clutch; therefore, the gearbox output shaft should be properly shifted with respect to the gearbox input shaft coaxial with the clutch.

This gearbox or change-speed gear 10 comprises a primary shaft 12 having its ends mounted by means of bearings 13 in the clutch and gearbox casing 1 and in the end cover 15 thereof. It further comprises two lay shafts 16, 17 also mounted at their ends in bearings 18 and 19, respectively.

Lay shaft 16 carries two loosely rotating pinions 20, 21 and a double synchronizer 22 of any suitable type is disposed between these pinions so that either of these two pinions 20, 21 may be selectively and synchronously caused to rotate bodily with the shaft 16 on which they are normally mounted for free rotation.

This synchronizer 22 comprises essentially (see FIGURE 4) a hub 23 rotatably solid with shaft 16 and a sliding or striker ring 24 slidably mounted through splines on said hub 23 so as to rotate bodily therewith, this sliding ring 24 having a neutral or intermediate position (as shown in the drawing) from which it can be moved selectively by means of a conventional-type control fork (not shown) to a position of engagement of its inner splines either with dog teeth 25 carried by pinion 20 or with other dog teeth 26 carried by the opposite pinion 21; thus one or the other of these pinions 20 or 21 may be caused to revolve bodily with shaft 16 through said hub 23. Between the sliding ring 24 and pinions 20, 21, synchronizer cones of known type are provided but their description is not deemed necessary herein inasmuch as this synchronization is not a determining factor in the operation of the mechanism of this invention.

The sliding ring 24 also carries an outer set of teeth 27 adapted to be engaged by a sliding pinion 28 providing the reverse and co-acting likewise with another pinion 29 rigid with and mounted intermediate the ends of primary shaft 12.

The other lay shaft 17 also carries a pair of loosely rotating pinions 30, 31 with a double synchronizer operating in the manner described hereinabove in connection with the first synchronizer 22, except that the sliding ring 32 of this synchronizer is also used for selectively connecting one of said pinions 30, 31 via the hub 33 to shaft 17, in that it has no peripheral set of teeth for engagement with the reversing sliding pinion 28.

The freely rotating pinions 20, 30 and 21, 31 are in constant meshing engagement with a pair of pinions 34, 35 respectively, which are rotatably solid with or keyed on the primary shaft 12.

In addition, lay shaft 16 carries at one end another pinion 36 rotatably solid therewith, and lay shaft 17 carries similarly a pinion 37 rotatably solid therewith, these two pinions 36, 37 being in constant meshing engagement with a common counter gear 38 rigid with an output shaft 39 of the transmission which is mounted in bearings carried by the casing 1 and its end cover 15.

The connecting shaft 11 transmits the drive from the output shaft 39 to a shaft 40 mounted through bearings in the differential casing 5 and provided with a driving pinion 41 constantly meshing with the crown wheel 42 of a conventional-type differential having output shafts 6 and 7 respectively.

The shaft 11 operatively connecting the clutch and gearbox or change speed transmission assembly 1 to the differential 4 consists of a shaft splined at its ends as shown at $11^1$ and $11^2$, and mounted in corresponding female splines formed in the tubular shafts 39 and 40, this shaft 11 being held in the axial direction by any suitable means such as pin 43 in this example.

It will be noted that due to this specific disposal of shaft 11 a certain degree of misalignment between its end spline mountings can be afforded without detrimentally affecting the oil-tightness of the casings, since this shaft is mounted in hollow shafts or shaft positions. Thus, this arrangement makes it possible to dispense with a generally costly and cumbersome universal joint while facilitating the mounting and disassembling of the transmission due to the great ease with which this shaft 11 operatively connecting the gearbox and the differential can be removed and fitted therebetween.

To the same end the engine is connected to the transmission through a shaft 44 mounted for free rotation in the crankshaft 3 as usual; this shaft 44 carrying a splined hub on which the clutch disc 9 is mounted has one end fitted in the primary hollow shaft 12 (see FIGURE 3) and is adapted to rotate bodily therewith due to a spline connection 45, a pin 46 holding this shaft against axial movement.

The various speeds obtainable by operating the sliding ring 24, the sliding hub 34 or sliding pinion 28, are provided by the following paths:

1st speed: pinion 34—pinion 20—sliding ring 24—shaft 16—pinion 36—pinion 38;
2nd speed: pinion 35—pinion 21—sliding ring 24—shaft 16—pinion 36—pinion 38;
3rd speed: pinion 34—pinion 30—sliding ring 32—shaft 17—pinion 37—pinion 38;
4th speed: pinion 35—pinion 31—sliding ring 32—shaft 17—pinion 37—pinion 38;
Reverse: pinion 29—sliding hub 28—dog teeth 27 of sliding ring 24—shaft 16—pinion 36—pinion 38.

Figure 5:
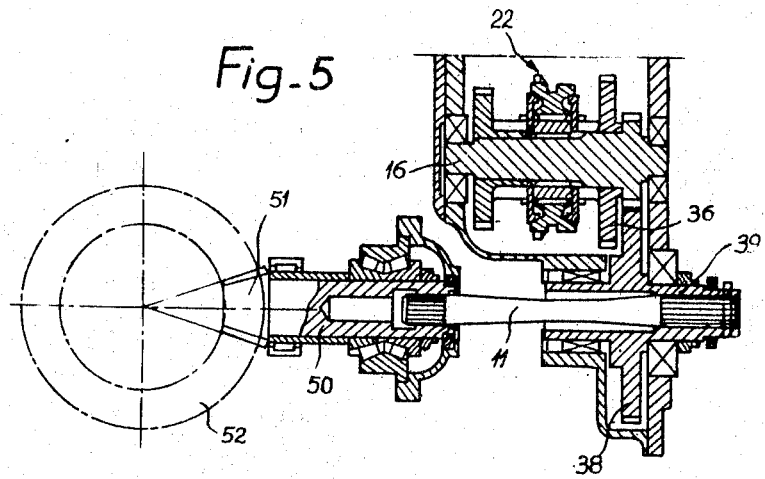
FIGURE 5 is a complementary fragmentary sectional view similar to that of FIGURE 4 but corresponding to a power unit and transmission assembly adapted to be mounted longitudinally on a vehicle.
Figure 9:
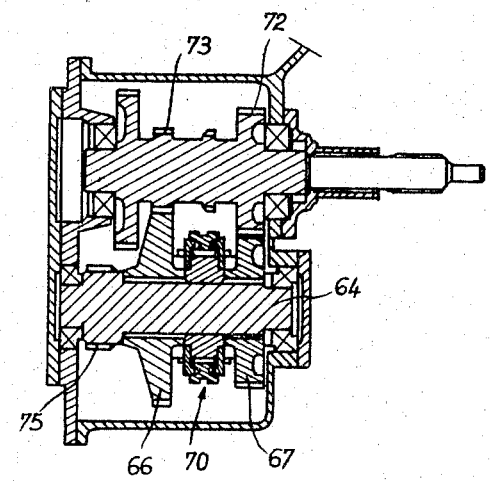
FIGURE 9 is another section taken upon the line IX—IX of FIGURE 7.
Figure 10:
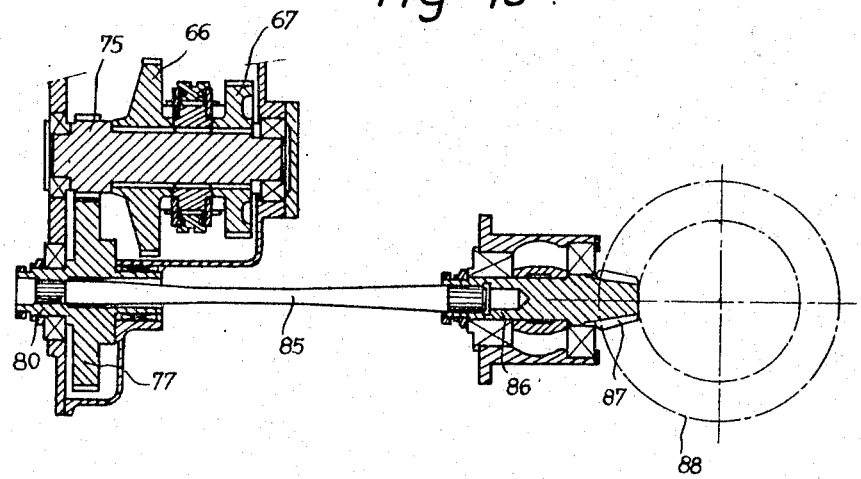
FIGURE 10 is a complementary sectional view taken upon the line X—X of FIGURE 7.

In the case of a longitudinal power-unit and transmission assembly as shown in FIGURE 5 the output shaft 39 of the final counter-gearing 36–38 of the gearbox may be connected as before by means of a splined shaft 11 to a tubular shaft 50 mounted in bearings supported by the differential casing. This shaft 50 carrying a bevel pinion 51 driving the crown wheel shown diagrammatically at 52; in this case the differential output shafts (not shown) extend at right angles to the plane of the figure.

The moderate longitudinal dimension of the gearbox, which is subordinate mainly to the space necessary for housing the two gear pinions with the synchromesh unit therebetween is a characteristic feature of this arrangement. In this respect it may be noted that the reducing gearing constituted by pinions 36, 37 and 38 positioned very close to one of said gear pinions may also be disposed on the same side as the clutch and thus take its place under the clutch withdrawal thrust bearing, for example in the space designated by the chain-dotted rectangle R in FIGURE 1, in which case the differential may be located further away from the clutch and beneath the engine.

Moreover, as the synchronisers are disposed midway in the reducing stages of the gearbow, notably in 1st and 2nd speeds, the dimensions of these synchronisers may be reduced considerably with respect to those of conventional four speed gearboxes.

Thus, in 1st speed the reducing ration provided by the gearbox is equal to the ratio of the radii of $$\frac{\text{pinion 34}}{\text{pinion 20}} \times \frac{\text{pinion 36}}{\text{pinion 38}}$$

so that when changing down to 1st speed the synchronizer will have to provide only the torque necessary for overcoming the inertia of the clutch disc (which is preponderant) multiplied in the ratio $$\frac{\text{pinion 20}}{\text{pinion 34}}$$

whereas in conventional gearbox this multiplication ratio concerning the inertia to be overcome would be the equivalent of the ratio $$\frac{\text{pinion 34}}{\text{pinion 20}} \times \frac{\text{pinion 38}}{\text{pinion 36}}$$

that is, more than twice the case illustrated in the figure.

For the same reason speed changes and notably to and from 1st and 2nd gears will be much easier in the cold state, when the oil drag interferes appreciably with the rotation of the component elements of the mechanism. The residual fluid-friction torque exerted by reaction on the bearing or working surfaces of a synchronizer of the preventer type will be reduced to the same extent as before, and the known difficulty of engaging a low gear in the cold state will be removed to a substantial degree.

In the case of mechanisms intended for passenger vehicles the $$\frac{\text{1st gear}}{\text{4th gear}}$$

reduction ratio differs slightly from the $$\frac{\text{3rd gear}}{\text{4th gear}}$$

reduction ratio, and the advantageous disposal of a primary shaft with only three pinions thereon, including the reverse pinion, can be obtained by using mechanical components having dimensions consistent with modern industrial practice.

However, if these ratios differ considerably as notably in commercial vehicles the desirable transmission ratios may lead to the use of an additional pinion on said primary shaft, as exemplified in FIGURES 6 to 10 inclusive.

Referring now to this modified construction it will be seen that in this case the crankshaft 60 is connected through the clutch 61 to a shaft 62 rigid with the primary shaft 63. As in the preceding example two intermediate or lay shafts 64, 65 carry each a pair of loosely rotating pinions (pinions 66, 67 on shaft 64 and pinions 68, 69 on shaft 65), the pinions of each pair being associated with an intermediate synchronizer 70, 71 respectively.

Pinions 67 and 68 of lay shafts 64, 65 mesh with a common pinion 72 rotatably rigid with primary shaft 63, and pinions 66, 69 mesh respectively with two pinions 73, 74 rotatably rigid with said primary shaft, these pinions 73, 74 being axially spaced from each other only to the extent necessary to permit these meshing engagements.

In addition, lay shaft 64 carries at one end a pinion 75 rotatably rigid therewith and lay shaft 65 carries similarly a pinion 76 rotatably rigid therewith; both pinions 75, 76 are in constant meshing engagement with a common counter-pinion 77 keyed on an output shaft 80 of the gearbox.

The sliding ring of synchronizer 71 carries peripheral teeth 81 adapted to be engaged by a reverse sliding pinion 82 also adapted in this case to engage another pinion 83 keyed on the primary shaft 63 intermediate its ends.

As in the preceding case, the output shaft 80 is hollow and formed with female splines; this shaft is connected through a shaft 85 formed with male splined end portions to another internally-splined hollow shaft 86 mounted in the differential casing and carrying pinion 87 meshing with the crown wheel shown diagrammatically at 88.

The various gear ratios obtainable by operating the sliding ring of synchronizer 70 or 71, or sliding pinion 82, are provided by the following paths:

1st speed: pinion 73—pinion 66—synchronizer 70—shaft 64—pinion 75—pinion 77;
2nd speed: pinion 72—pinion 67—synchronizer 70—shaft 64—pinion 75—pinion 77;
3rd speed: pinion 72—pinion 68—synchronizer 71—shaft 65—pinion 76—pinion 77;
4th speed: pinion 74—pinion 69—synchronizer 71—shaft 65—pinion 76—pinion 77;
Reverse: pinion 83—sliding pinion 82—teeth 81 of sliding ring of synchronizer 71—shaft 65—pinion 76—pinion 77.

It will be noted that with the transmission assembly according to this invention it is possible to provide under particularly economical conditions a power take-off revolving independently of the transmission, for example at the gearbox output end of the primary shaft, so that this power take-off can be used when the vehicle is at a standstill with the sliding rings in their neutral position, and also—of course—when the vehicle is running.

Moreover, notably in the case of commercial vehicles, this arrangement is particularly convenient for providing from the gearbox output two opposite shafts for driving two separate axles, these shafts consisting for example of members such as shaft 85 (FIGURE 10) which are disposed in axial alignment and mounted in female splines provided in a hollow output shaft such as shaft 80 of this specific form of embodiment.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:
1. A transmission for vehicles having an engine with a crankshaft, a clutch and gearbox assembly coupled directly to the output end of the engine crankshaft and a differential disposed beneath the engine and connected by a transmission shaft to said assembly, characterized in that said gearbox comprises a primary shaft, two first pinions fixedly mounted on said primary shaft, two lay shafts parallel to said primary shaft, two loosely rotating second pinions on each said lay shaft in constant meshing engagement with said two first pinions on said primary shaft, synchronizer means on each said lay shaft, sliding ring means on each said synchronizer to selectively cause one of said loosely rotating second pinions to become rotatably solid with the lay shaft on which it is mounted, a third pinion rotatably solid with each lay shaft, a counter pinion common to and in constant engagement with said third pinions, an output shaft in axial alignment with said transmission shaft, said counter pinion being rotatably rigid with said output shaft.

2. A transmission according to claim 1 in which said first pinions rotatably solid with said primary shaft are common to the two pairs of loosely rotating second pinions of said lay shafts.

3. A transmission according to claim 1 in which a reverse pinion is mounted solid with and on the central portion of said primary shaft, a peripheral set of teeth on one of said sliding rings, and a reverse sliding pinion adapted to engage said reverse pinion and said peripheral set of teeth of said sliding ring.

4. A transmission according to claim 1 in which said transmission shaft has one end rotatably solid with said output shaft which is hollow in order to permit the insertion of the end of said transmission shaft therein, and the other end inserted into a hollow portion of a differential driving shaft.

5. A transmission according to claim 1 in which the primary shaft of said gearbox is hollow and has a clutch output shaft mounted therein so as to be rotatably solid therewith and easily removable therefrom.

References Cited by the Examiner
UNITED STATES PATENTS

| | | | |
|---|---|---|---|
| 1,282,598 | 10/1918 | Lamb | 64—9 |
| 1,724,202 | 8/1929 | Jacobs | 74—331 |
| 3,115,048 | 12/1963 | Cape | 74—700 |

DAVID J. WILLIAMOWSKY, *Primary Examiner.*

H. S. LAYTON, *Assistant Examiner.*